(12) United States Patent
Yamamoto et al.

(10) Patent No.: US 7,310,188 B2
(45) Date of Patent: Dec. 18, 2007

(54) PROJECTION LENS AND PROJECTION TYPE DISPLAY DEVICE USING THE SAME

(75) Inventors: Chikara Yamamoto, Saitama (JP); Hiroshi Yamada, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 0 days.

(21) Appl. No.: 11/783,028

(22) Filed: Apr. 5, 2007

(65) Prior Publication Data

US 2007/0236804 A1   Oct. 11, 2007

(30) Foreign Application Priority Data

Apr. 6, 2006    (JP) .......................... P2006-105565

(51) Int. Cl.
  *G02B 3/00*    (2006.01)
  *G02B 3/12*    (2006.01)
  *G02B 9/12*    (2006.01)

(52) U.S. Cl. ...................... 359/651; 359/649; 359/716; 359/740; 359/784

(58) Field of Classification Search ........ 359/649–651, 359/716, 740, 751, 784
See application file for complete search history.

(56) References Cited

U.S. PATENT DOCUMENTS

| 5,745,297 | A | 4/1998 | Kaneko et al. | |
| 6,636,361 | B2 * | 10/2003 | Wada | 359/649 |
| 7,016,118 | B2 * | 3/2006 | Wada | 359/676 |
| 2005/0219711 | A1 * | 10/2005 | Wada | 359/689 |
| 2006/0012755 | A1 * | 1/2006 | Ikeda et al. | 353/34 |
| 2006/0146421 | A1 * | 7/2006 | Yamada | 359/689 |
| 2006/0176576 | A1 * | 8/2006 | Nagahara et al. | 359/680 |

FOREIGN PATENT DOCUMENTS

| JP | 3466002 B2 | 8/2003 |
| JP | 2003-287676 A | 10/2003 |
| JP | 2005-173494 A | 6/2005 |

\* cited by examiner

*Primary Examiner*—Evelyn A. Lester
(74) *Attorney, Agent, or Firm*—Birch, Stewart, Kolasch & Birch, LLP

(57) ABSTRACT

A projection lens includes, in order from a magnification side, a first lens group, a second lens group and a third lens group. The first lens group includes, in order from the magnification side, a negative lens whose lens made of a non-resin, a plastic lens at least one surface of which is aspheric and a positive lens. The second lens group includes a plastic lens at least one surface of which is aspheric, a positive lens and a negative lens. The third lens group includes a positive lens. The following conditional expressions are satisfied;

$1.0 < Bf/f \leq 1.8$ $2.0 < f1/f$ $2.0 < f2/f$ where Bf denotes a air-conversion back focus of the entire system, f denotes a focal length of the entire system, f1 denotes a focal length of the first lens group and f2 denotes a focal length of the second lens group.

20 Claims, 9 Drawing Sheets

FIRST EXAMPLE

*FIG. 1* FIRST EXAMPLE

FIG. 2 SECOND EXAMPLE

THIRD EXAMPLE

FIG. 4 FOURTH EXAMPLE

PROJECTION LENS AND PROJECTION TYPE DISPLAY DEVICE USING THE SAME

BACKGROUND OF THE INVENTION

1. Technical Field

The invention relates to a projection lens installed into a projection type display device and a projection type display device and, more particularly, a projection lens used in a projector system into which a light valve such as a transmission type liquid crystal, a reflection type liquid crystal or DMD (Digital Micromirror Device) is installed.

2. Description of the Related Art

A spreading speed of the recent projector is rapid, and the inexpensive projector is requested. Also, in respond to this request, the lens having a small number of constituent lenses is demanded of the projection lens used in the projector. However, performance deterioration is caused when the number of constituent lenses is reduced simply. In order to compensate such performance deterioration, the development of the lens having a small number of constituent lenses by using a lot of aspheric surfaces, and the like is proceeding. Such projection lens having a small number of constituent lenses and using the plastic aspheric surfaces is disclosed in JP 2003-287676 A, JP 2005-173494 A and Japanese Patent No. 3466002 (corresponding to U.S. Pat. No. 5,745,297).

However, since the lens disclosed in JP 2003-287676 A has a wide angle of view larger than 75 degree, such a lens is unsuitable for the application as the front projector that projects the image from the viewer side. In other words, when the image is projected within the screen at the above angle of view, the projector must be positioned near the screen and therefore the projector itself constitutes an obstacle to the user who watches the image on the screen. In order to prevent a situation that the projector itself acts as a visual obstacle, an image circle may be enlarged and the image may be shifted in the circle. In this case, since the lens should also be enlarged, a size of the device is increased.

Also, in JP2005-173494 A and Japanese Patent No. 3466002, the projection lens arranged mostly on the magnification side is formed of the plastic lens that does not endure the contact by the user's finger, or the like. Therefore, such projection lens is not suitable for the application as the front projector.

SUMMARY OF THE INVENTION

The invention has been made in view of the above circumstances, and provides an inexpensive projection lens that has a small number of constituent lenses and is suitable for the front projector with considering the influence of the user's contact, and a projection type display device using the same.

A projection lens includes, in order from a magnification side, a first lens group, a second lens group and a third lens group. The first lens group includes, in order from the magnification side, a negative lens whose lens made of a non-resin, a plastic lens at least one surface of which is aspheric and a positive lens. The second lens group includes a plastic lens at least one surface of which is aspheric, a positive lens and a negative lens. The third lens group includes a positive lens. The following conditional expressions are satisfied.

$$1.0 < Bf/f \leq 1.8 \tag{1}$$

$$2.0 < f1/f \tag{2a}$$

$$2.0 < f2/f \tag{3}$$

where Bf denotes a air-conversion back focus of the entire system, f denotes a focal length of the entire system, f1 denotes a focal length of the first lens group and f2 denotes a focal length of the second lens group.

Also, a system from a surface of the positive lens of the third lens group on a reduction side to a display surface may be substantial telecentric. The following conditional expressions (2b) and (3b) may be further satisfied.

$$4.0 < f1/f \tag{2b}$$

$$3.5 < f2/f \tag{3b}$$

Also, the following conditional expressions (4) and (5) may be further satisfied.

$$2.5 < |AS1/f| \tag{4}$$

$$2.5 < |AS2/f| \tag{5}$$

where AS1 denotes a focal length of the plastic aspheric lens of the first lens group, and AS2 denotes a focal length of the plastic aspheric lens of the second lens group.

Also, in the second lens group, the plastic lens the at least one surface of which is aspheric, the positive lens and the negative lens may be arranged in order from the magnification side. The positive lens of the second lens group and the negative lens of the second lens group may be cemented.

Also, the following conditional expression (3c) may be further satisfied.

$$10.0 < f2/f \tag{3c}$$

Also, in the second lens group, the plastic lens at the least one surface of which is aspheric, the negative lens and the positive lens may be arranged in order from the magnification side. The negative lens of the second lens group and the positive lens of the second lens group may be cemented.

Also, in the second lens group, the negative lens, the positive lens and the plastic lens the at least one surface of which is aspheric may be arranged in order from the magnification side. The negative lens of the second lens group and the positive lens of the second lens group may be cemented.

Also, the following conditional expression (6) may be further satisfied.

$$f2/f < 10.0 \tag{6}$$

According to another aspect of the invention, a projection type display device includes a light source, a light valve, an illumination optical portion that guides a luminous flux from the light source to the light valve, and any of the projection lenses set forth above. The luminous flux from the light source is optically modulated by the light valve and is projected onto a screen by the projection lens.

Here, the "non-resin lens" means a lens in which a resin such as plastics is not used as material, and means mainly a glass lens.

With the projection lens of three lens groups and the projection type display device according to the invention, the first lens group includes, in order from the magnification side, a negative lens whose lens made of a non-resin, a plastic lens at least one surface of which is aspheric and a positive lens; the second lens group includes a plastic lens at least one surface of which is aspheric, a positive lens and a negative lens; the third lens group includes a positive lens; and the conditional expression (1) is satisfied. Thereby, the sufficient back focus can be obtained while keeping a wide angle of view. Also, the conditional expressions (2a) and (3a) are satisfied. Thereby, a reduction in size can be achieved and the aberration correction can be improved.

In addition, the non-resin material is selected as the material of the lens that is arranged on the outermost magnification side and exposed to the outer environment. Therefore, such lens is hardly influenced by the user's contact, and the like.

DETAILED DESCRIPTION OF EMBODIMENTS OF THE INVENTION

Figure 1:
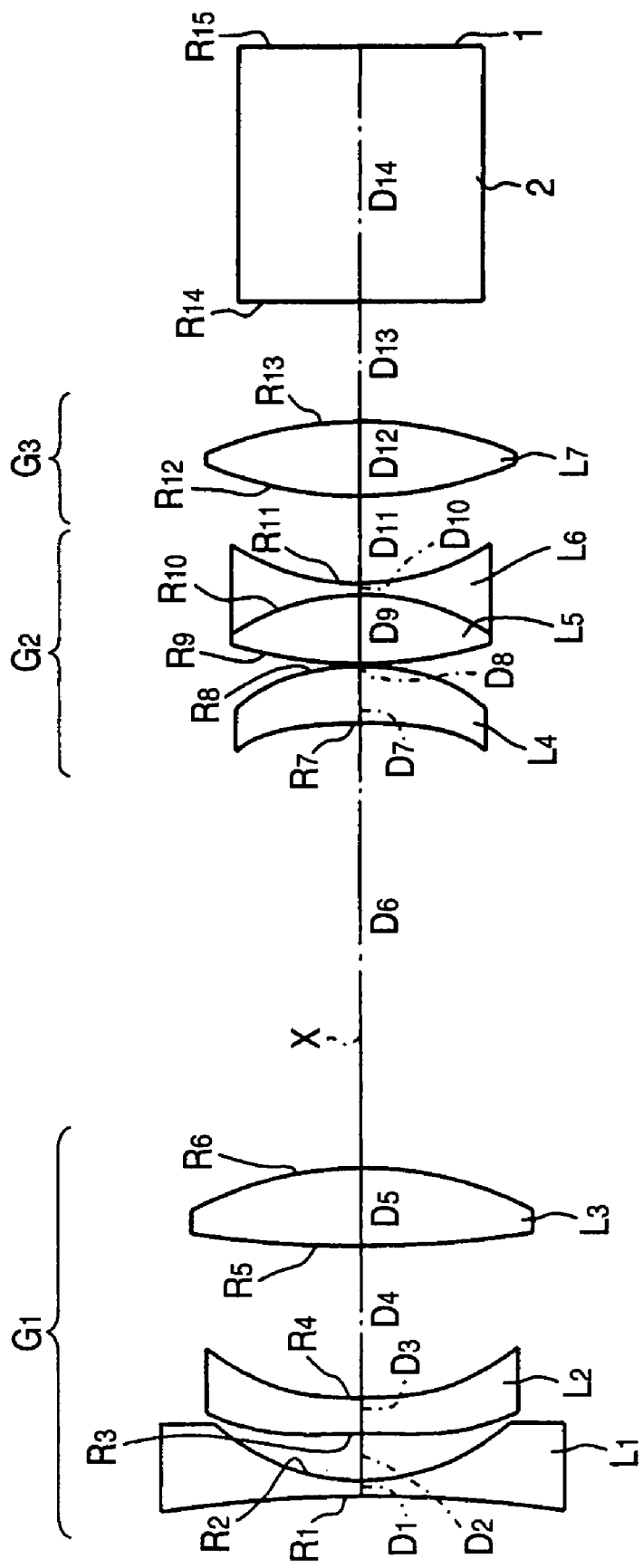
FIG. 1 is a lens configurative view of a projection lens according to an example 1.

Embodiments of the invention will be explained with reference to the drawings herein after. FIG. 1 shows the basic configuration of a projection lens of an example 1 according to the invention. As a typical example of this embodiment, a projection lens according to the example 1 will be explained hereunder.

More particularly, this projection lens is configured so that a first lens group $G_1$, a second lens group $G_2$, a third lens group $G_3$ are arranged in order from the magnification side. The first lens group $G_1$ includes a first lens $L_1$ which is a negative lens made of a non-resin, a second lens $L_2$ which is a negative lens made of plastic and having an aspheric surface, and a third lens $L_3$ which is a positive lens. The second lens group $G_2$ includes a fourth lens $L_4$ which is a positive lens made of plastic and having an aspheric surface, and a cemented lens formed of a fifth lens $L_5$ which is a positive lens and a sixth lens $L_6$ which is a negative lens. The third lens group $G_3$ includes a seventh lens $L_7$ which is a positive lens. In this case, the arrangement order of the lenses L4 to L6 of the second lens group $G_2$ is not limited to the arrangement described above (respective modes will be explained in respective examples).

Here, a glass block 2 corresponding to an infrared cutting filter, a low-pass filter, and a color synthesis optical system (color separation optical system) is disposed between the third lens group $G_3$ and a display plane 1 of a liquid crystal display device or a DMD. Also, a reference "X" in FIG. 1 denotes an optical axis.

Also, the respective spherical surfaces in this embodiment are given by the following aspheric formula.

Aspheric Formula $$Z = \frac{Y^2/R}{1+\sqrt{1-K \times Y^2/R^2}} + \sum_{i=3}^{12} A_i Y^i$$

where
  Z: a length of a perpendicular line drawn from a point on an aspheric surface at a distance Y from an optical axis to a tangent plane (a plane perpendicular to the optical axis) of a vertex of the aspheric surface
  Y: a distance from the optical axis
  R: a radius of curvature of the aspheric surface in the vicinity of the optical axis
  K: an eccentricity
  $A_i$: an aspheric coefficient (i=3 to 12)

Also, in this embodiment, the conditional expressions (1), (2a), (2b), (3a), (3b), (4), (5) given hereunder are satisfied. Also, the conditional expression (3c) given hereunder is satisfied in the examples 1 and 4. The conditional expression (3c) given hereunder is satisfied in the examples 2 and 3.

| | |
|---|---|
| $1.0 < Bf/f \leq 1.8$ | (1) |
| $2.0 < f1/f$ | (2a) |
| $2.0 < f2/f$ | (3a) |
| $4.0 < f1/f$ | (2b) |
| $3.5 < f2/f$ | (3b) |
| $10.0 < f2/f$ | (3c) |
| $2.5 < |AS1|/f$ | (4) |
| $2.5 < |AS2|/f$ | (5) |
| $f2/f < 10.0$ | (6) | where
  Bf: an air-conversion back focus of the entire system,
  f: a focal length of the entire system,
  f1: a focal length of the first lens group,
  f2: a focal length of the second lens group,
    AS1: a focal length of the plastic aspheric lens of the first lens group,
    AS2: a focal length of the plastic aspheric lens of the second lens group.

Next, the technical meaning of the above conditional expressions (1) to (6) will be explained hereunder.

The conditional expression (1) is defined to attain a wider angle of the lens and the sufficient back focus. When Bf/f exceeds the upper limit, the back focus is excessively prolonged and thus a size of the lens system is increased. In contrast, when Bf/f falls below the lower limit, the back focus is excessively shortened and thus the optical member such as the color synthesizing portion cannot be inserted.

The conditional expression (2a) defines a power of the first lens group $G_1$. When f1/f is a positive value and falls below the lower limit, the back focus is excessively shortened and thus it is difficult to make the aberration correction.

In contrast, when f1/f is a negative value and falls below the lower limit, the back focus is excessively prolonged and thus a size of the lens system is increased.

The conditional expression (3a) defines a power of the second lens group $G_2$. A resultant advantage is substantially similar to that of the conditional expression (2a).

The conditional expression (2b) narrows the lower limit of the conditional expression (2a) such that the advantage achieved by the conditional expression (2a) is further enhanced.

The conditional expression (3b) narrows the lower limit of the conditional expression (3a) such that the advantage achieved by the conditional expression (3a) is further enhanced.

The conditional expression (3c) narrows the lower limit of conditional expression (3b) such that the advantage achieved by the conditional expression (3b) is further enhanced.

The conditional expression (4) defines a power of the plastic aspheric lens of the first lens group $G_1$. When |AS1/f| falls below the lower limit, the performance deterioration caused due to a change of temperature is excessively increased.

The conditional expression (5) defines a power of the plastic aspheric lens of the second lens group $G_2$. When |AS2/f| falls below the lower limit, the performance deterioration caused due to a change of temperature is excessively increased.

The conditional expression (6) defines the back focus. When f2/f exceeds the upper limit, the back focus is excessively prolonged and thus a size of the lens system is increased.

Figure 9:
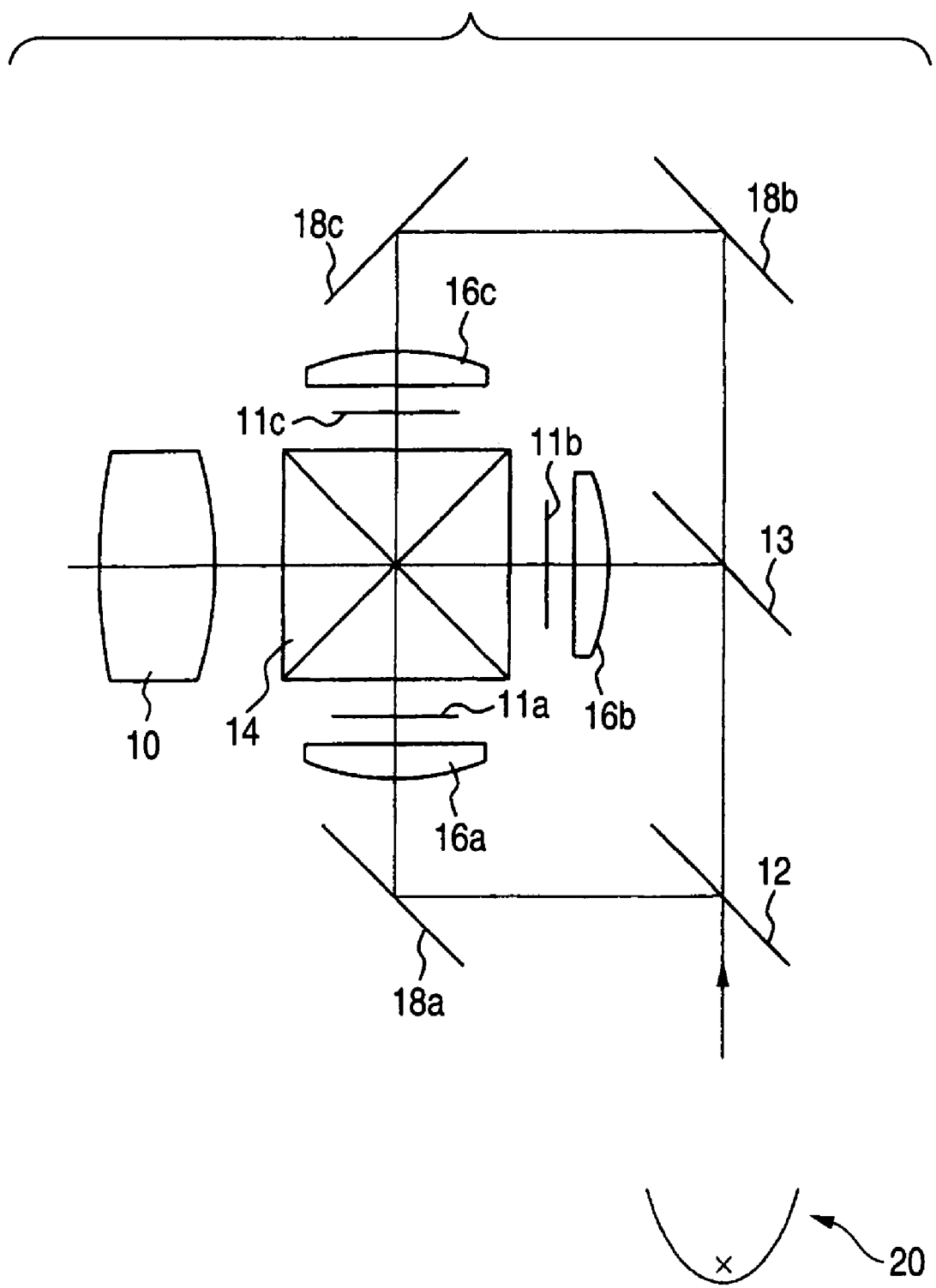
FIG. 9 is a schematic configurative view of a projection type display device using the projection lens according to the exemplary embodiment.

Next, an example of a projection type display device into which the above projection lens is incorporated will be explained with reference to FIG. 9 hereunder. The projection type display device shown in FIG. 9 includes transmission liquid crystal panel 11a to 11c as light valves, and uses the above projection lens according to this embodiment as a projection lens 10. Also, illustration between a light source 20 and a dichroic mirror 12 is omitted herein. But a white light from the light source 20 is incident on liquid crystal panels 11a to 11c corresponding to three-color luminous fluxes (G light, B light, R light) respectively via an illumination optical system, then modulated optically, then color-synthesized by a cross dichroic prism 14, and then projected onto a screen (not shown) by a projection lens 10. This device includes dichroic mirrors 12, 13 for the color separation, the cross dichroic prism 14 for the color synthesis, condenser lenses 16a to 16c, and total reflection mirrors 18a to 18c. Since the projection type display device of this embodiment uses the projection lens according to this embodiment, the projection type display device that can provide a good picture quality of the projected image at a wide angle and take an account the influence of the contact of the user's finger, and the like can be obtained.

Here, the projection lens of the invention is not limited to the use mode as the projection lens in the projection type display device using the transmission type liquid crystal display panel. This projection lens can be used as the projection lens of the device using a reflection type liquid crystal display panel or other optical modulating means such as DMD, or the like, and the like.

EXAMPLES

The respective examples will be described specifically by using the following data.

Example 1

As described above, the projection lens according to the example 1 is configured as shown in FIG. 1. That is, in this projection lens, the first lens group $G_1$ includes the first lens $L_1$ which is a biconcave lens, the second lens $L_2$ formed of a biconcave lens in the vicinity of the optical axis, and the third lens $L_3$ formed of a biconvex lens in order from the magnification side. Also, the second lens group $G_2$ includes the fourth lens $L_4$ which is a positive meniscus lens whose concave surface is directed to the magnification side, and the cemented lens constructed by the fifth lens $L_5$ formed of a biconvex lens and the sixth lens $L_6$ formed of a biconcave lens. Also, the third lens group $G_3$ includes the seventh lens $L_7$ formed of a biconvex lens. In this case, the first lens $L_1$ is formed of a glass lens.

In this example 1, radii R of curvature of respective lens surfaces (normalized under the assumption that a focal length of the entire lens system is set to 1; the same rule applies to the following tables respectively), center thicknesses of the respective lenses and air distances D between the respective lens (normalized similarly to the radius R of curvature; the same rule applies to the following tables respectively), refractive indices Nd and Abbe numbers νd of the respective lenses with respect to the d line are given on the upper portion of a table 1. In this table 1 and tables 2 to 4 described later, numerical values corresponding to respective symbols R, D, Nd, and νd are given to increase sequentially from the magnification side.

Although not shown in FIG. 1, a mask may be provided. Also, the mask may be a diaphragm.

Also, the third surface, the fourth surface and the seventh surface, the eighth surface are formed into aspherical surfaces, respectively. In the lower portion of the Table 1, values of respective constants K, $A_3$, $A_4$, $A_5$, $A_6$, $A_7$, $A_8$, $A_9$, $A_{10}$, $A_{11}$, $A_{12}$ as to these aspheric surfaces in the above aspheric formula are given.

TABLE 1

| Surface | R | D | Nd | ν d |
|---|---|---|---|---|
| 1 | −6.8936 | 0.0747 | 1.56883 | 56.4 |
| 2 | 1.1095 | 0.2262 | | |
| *3 | −3.9371 | 0.1744 | 1.49100 | 57.6 |
| *4 | 3.4053 | 0.7406 | | |
| 5 | 5.7561 | 0.3817 | 1.71300 | 53.9 |
| 6 | −1.8391 | 2.1653 | | |
| *7 | −2.8579 | 0.2787 | 1.49100 | 57.6 |
| *8 | −1.1895 | 0.0100 | | |
| 9 | 2.2877 | 0.3362 | 1.62041 | 60.3 |
| 10 | −1.1808 | 0.0548 | 1.64769 | 33.8 |
| 11 | 1.1808 | 0.4295 | | |
| 12 | 2.0224 | 0.3604 | 1.58913 | 61.1 |
| 13 | −2.0224 | 0.5780 | | |
| 14 | ∞ | 1.2208 | 1.51633 | 64.1 |
| 15 | ∞ | | | |

*Aspheric Surface

Aspheric Coefficients

| Surface | K | $A_3$ | $A_4$ | $A_5$ |
|---|---|---|---|---|
| 3 | 1.0000 | 0.0000 | 1.3304 | −6.5956 × 10⁻¹ |
| 4 | 1.0000 | 0.0000 | 1.2935 | −9.0188 × 10⁻¹ |
| 7 | 1.0000 | 0.0000 | −2.2875 × 10⁻¹ | 3.1223 × 10⁻¹ |

TABLE 1-continued

| 8 | 1.0000 | 0.0000 | $-8.2131 \times 10^{-2}$ | $3.9199 \times 10^{-2}$ |

| Surface | $A_6$ | $A_7$ | $A_8$ |
|---|---|---|---|
| 3 | −1.9036 | 1.5967 | 2.2048 |
| 4 | $-8.9890 \times 10^{-1}$ | 1.1773 | $8.2699 \times 10^{-1}$ |
| 7 | −1.2193 | $3.9879 \times 10^{-1}$ | 1.0629 |
| 8 | $5.7905 \times 10^{-1}$ | −3.8238 | 4.6682 |

| Surface | $A_9$ | $A_{10}$ | $A_{11}$ | $A_{12}$ |
|---|---|---|---|---|
| 3 | −1.7693 | −4.0166 | 3.7778 | $1.7758 \times 10^{-1}$ |
| 4 | −3.3632 | $2.3424 \times 10^{-1}$ | 3.9352 | −1.7857 |
| 7 | 5.4542 | $-2.9840 \times 10$ | $4.9896 \times 10$ | $-3.3882 \times 10$ |
| 8 | 2.6432 | −7.0428 | −1.3358 | 2.7981 |

Also, numerical values corresponding to the above conditional expressions in the example 1 are given in a table 5.

Figure 5:
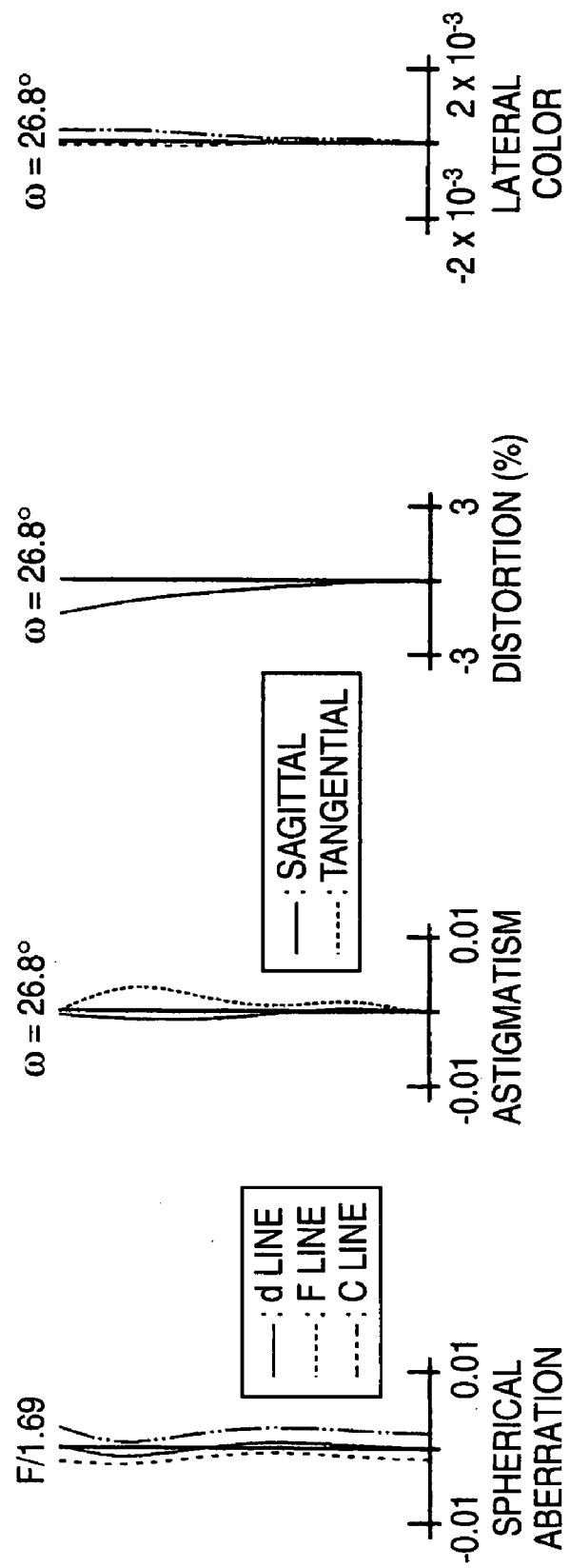
FIG. 5 is respective aberration charts of the projection lens according to the example 1.

FIG. 5 is aberration charts showing various aberrations (spherical aberration, astigmatism, distortion, and lateral color) of the projection lens according to the example 1. In FIG. 5 and FIGS. 6 to 8, aberrations with respect to a sagittal image surface and a tangential image surface are shown in the respective aberration charts, and also aberrations of the F line and the C line with respect to the d line are shown in each lateral color chart.

As apparent from FIG. 5, according to the projection lens of the example 1, the angle of view 2ω is 53.6 degrees and wide and the respective aberrations are corrected satisfactorily. In particular, the lateral color is very satisfactorily corrected.

Also, as shown in the table 5, according to the projection lens of the example 1, the conditional expressions (1), (2a), (2b), (3a), (3b), (3c), (4), (5) are satisfied.

Example 2

Figure 2:
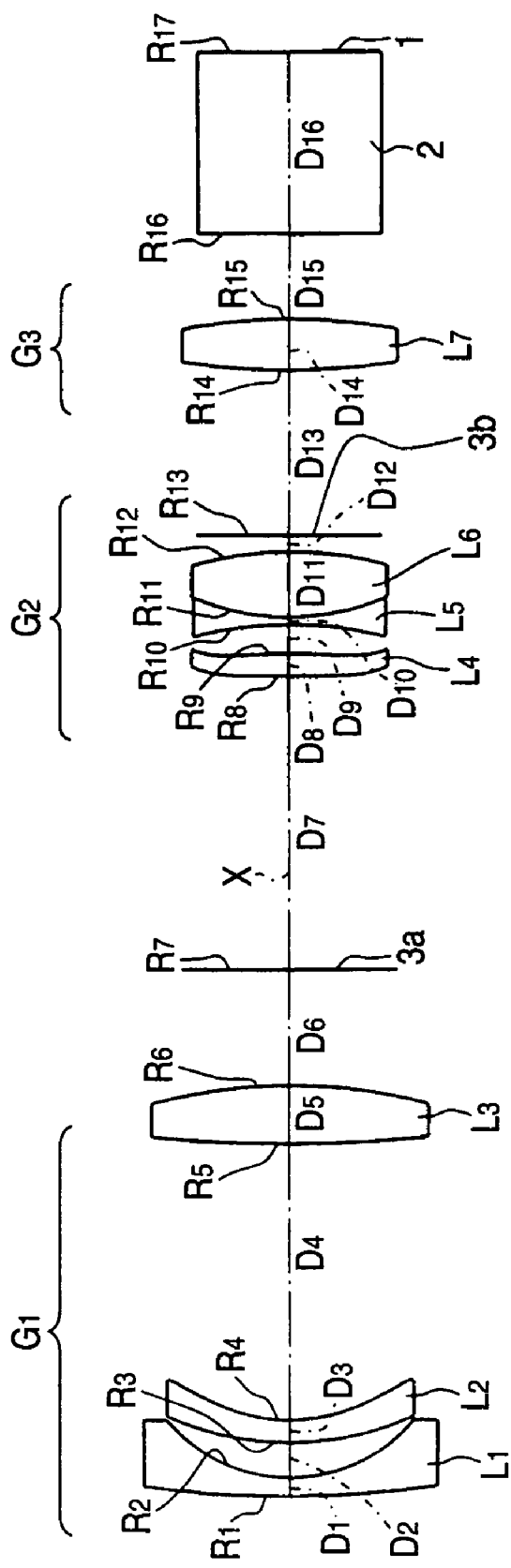
FIG. 2 is a lens configurative view of a projection lens according to an example 2.

The schematic configuration of a projection lens according to the example 2 is shown in FIG. 2. The projection lens according to the example 2 is configured substantially similarly to that according to the example 1. A major difference from the example 1 is that the first lens $L_1$ and the second lens $L_2$ of the first lens group $G_1$ are formed of a negative meniscus lens whose convex surface is directed to the magnification side, that the cemented lens of the second lens group $G_2$ is constructed by the fifth lens $L_5$ formed of a biconcave lens and the sixth lens $L_6$ formed of a biconvex lens, and that masks 3a, 3b are disposed. However, it is not necessary to provide the masks. Also, a diaphragm may be employed as the mask. Positions of the masks 3a, 3b are not limited to those shown in FIG. 2, and setting positions of the masks 3a, 3b may be changed appropriately.

In this example 2, radii R of curvature of the respective lens surfaces, center thicknesses of the respective lenses, air distances D between the respective lens, refractive indices Nd and Abbe numbers νd of the respective lenses with respect to the d line are given on the upper portion of table 2.

Also, the third surface, the fourth surface and the eighth surface, the ninth surface are formed of the aspherical surfaces, respectively. In a lower portion in the table 2, values of the respective constants K, $A_3$, $A_4$, $A_5$, $A_6$, $A_7$, $A_8$, $A_9$, $A_{10}$, $A_{11}$, $A_{12}$ as to these aspheric surfaces in the above aspheric formula are given.

[Table 2]

| Surface | R | D | Nd | ν d |
|---|---|---|---|---|
| 1 | 7.1328 | 0.1233 | 1.55020 | 58.0 |
| 2 | 1.0733 | 0.2381 | | |
| *3 | 2.2562 | 0.1503 | 1.51007 | 56.2 |
| *4 | 1.1510 | 1.8510 | | |
| 5 | 9.0597 | 0.3921 | 1.83500 | 44.5 |
| 6 | −3.6828 | 0.7895 | | |
| 7 | ∞ | 1.9876 | (mask) | |
| *8 | −92.0667 | 0.1537 | 1.51007 | 56.2 |
| *9 | −3.9055 | 0.1995 | | |
| 10 | −2.5272 | 0.0498 | 1.77164 | 26.4 |
| 11 | 1.6638 | 0.4407 | 1.83498 | 44.5 |
| 12 | −2.4943 | 0.1135 | | |
| 13 | ∞ | 1.1026 | (mask) | |
| 14 | 4.6424 | 0.3471 | 1.69408 | 56.8 |
| 15 | −3.9228 | 0.5699 | | |
| 16 | ∞ | 1.2088 | 1.51633 | 64.1 |
| 17 | ∞ | | | |

*Aspheric Surface

Aspheric Coefficients

| Surface | K | $A_3$ | $A_4$ | $A_5$ |
|---|---|---|---|---|
| 3 | 1.0000 | 0.0000 | $1.2810 \times 10^{-1}$ | 0.0000 |
| 4 | 1.0000 | 0.0000 | $3.6669 \times 10^{-2}$ | 0.0000 |
| 8 | 1.0000 | 0.0000 | $2.6684 \times 10^{-1}$ | 0.0000 |
| 9 | 1.0000 | 0.0000 | $2.9253 \times 10^{-1}$ | 0.0000 |

| Surface | $A_6$ | $A_7$ | $A_8$ | $A_9$ |
|---|---|---|---|---|
| 3 | $-2.1719 \times 10^{-1}$ | 0.0000 | $1.9809 \times 10^{-1}$ | 0.0000 |
| 4 | $-3.4079 \times 10^{-1}$ | 0.0000 | $2.3257 \times 10^{-1}$ | 0.0000 |
| 8 | $-3.4575 \times 10^{-2}$ | 0.0000 | 1.4737 | 0.0000 |
| 9 | $1.4564 \times 10^{-1}$ | 0.0000 | $7.7288 \times 10^{-1}$ | 0.0000 |

| Surface | $A_{10}$ | $A_{11}$ | $A_{12}$ |
|---|---|---|---|
| 3 | $-1.0039 \times 10^{-1}$ | 0.0000 | 0.0000 |
| 4 | $-1.8090 \times 10^{-1}$ | 0.0000 | 0.0000 |
| 8 | −2.6482 | 0.0000 | 2.1230 |
| 9 | $-8.7913 \times 10^{-1}$ | 0.0000 | $8.7415 \times 10^{-1}$ |

Also, numerical values corresponding to the above conditional expressions in the example 2 are given in the table 5.

Figure 6:
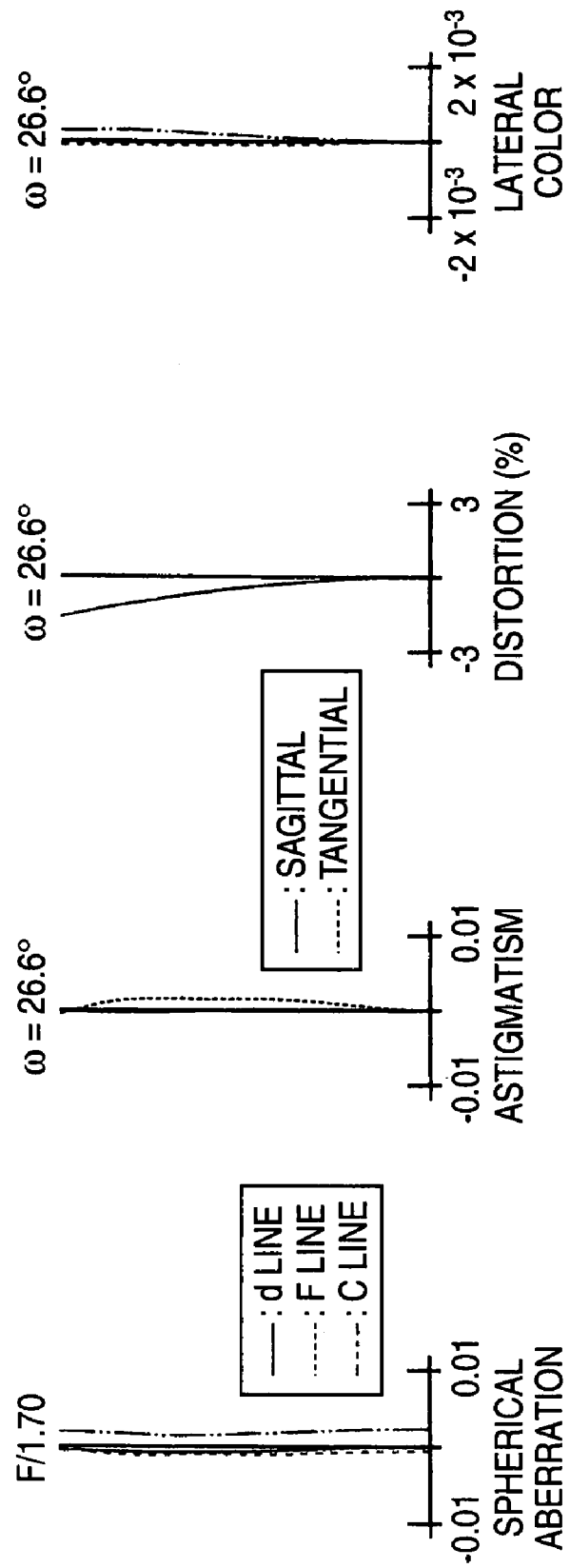
FIG. 6 is respective aberration charts of the projection lens according to the example 2.

FIG. 6 is aberration charts showing various aberrations (spherical aberration, astigmatism, distortion, and lateral color) of the projection lens according to the example 2.

As apparent from FIG. 6, according to the projection lens of the example 2, the angle of view 2ω is 53.2 degrees and wide and the respective aberrations are corrected satisfactorily. In particular, the lateral color is very satisfactorily corrected.

Also, as shown in the table 5, according to the projection lens of the example 2, the conditional expressions (1), (2a), (2b), (3a), (3b), (4), (5) and (6) are satisfied.

Example 3

Figure 3:
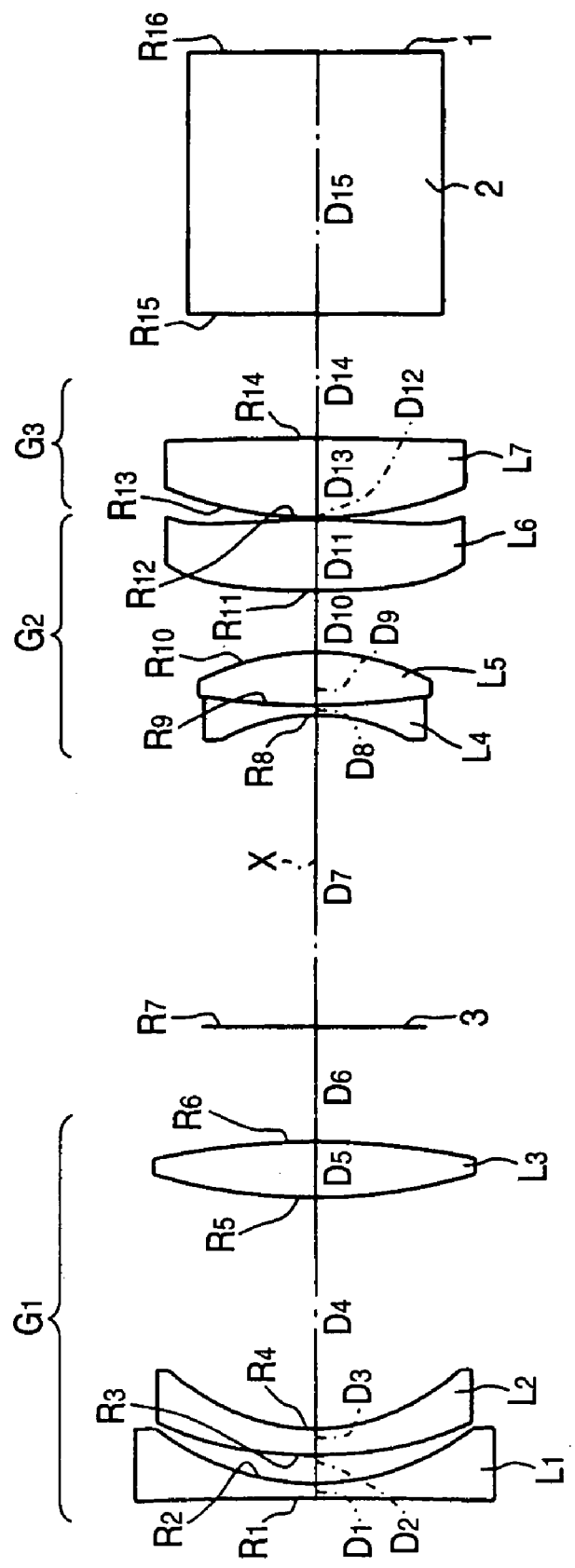
FIG. 3 is a lens configurative view of a projection lens according to an example 3.

The schematic configuration of a projection lens according to the example 3 is shown in FIG. 3. The projection lens according to the example 3 is configured substantially similarly to that according to the example 1. A major difference from the example 1 is that the second lens $L_2$ of the first lens group $G_1$ is formed of a negative meniscus lens whose convex surface is directed to the magnification side, that the second lens group $G_2$ includes the cemented lens configured by the fourth lens $L_4$ formed of a biconcave lens and the fifth lens $L_5$ formed of a biconvex lens and the sixth lens $L_6$ formed of a biconvex lens in the vicinity of the optical axis, and that a mask 3 is provided. However, it is not necessary to provide the mask 3, and a diaphragm may be employed as the mask 3. Also, a position of the mask 3 is not limited to that shown in FIG. 3, and a setting position of the mask 3 may be changed appropriately.

In this Example 3, radii R of curvature of the respective lens surfaces, center thicknesses of the respective lenses, air distances D between the respective lenses, refractive indices Nd, and Abbe numbers νd of the respective lenses with respect to the d line are given in the upper portion of the table 3.

Also, the third surface, the fourth surface and the eleventh surface, the twelfth surface are formed of the aspherical surfaces, respectively. In a lower portion of the table 3, values of the respective constants K, $A_3$, $A_4$, $A_5$, $A_6$, $A_7$, $A_8$, $A_9$, $A_{10}$, $A_{11}$, $A_{12}$ as to these aspheric surfaces in the above aspheric formula are given.

[Table 3]

| Surface | R | D | Nd | ν d |
|---|---|---|---|---|
| 1 | −29.5273 | 0.0691 | 1.49601 | 55.8 |
| 2 | 1.2465 | 0.1322 | | |
| *3 | 2.2861 | 0.1234 | 1.51007 | 56.2 |
| *4 | 0.9650 | 1.0892 | | |
| 5 | 2.7715 | 0.2634 | 1.80000 | 48.0 |
| 6 | −3.6643 | 0.5427 | | |
| 7 | ∞ | 1.4664 | (mask) | |
| 8 | −0.9148 | 0.0449 | 1.74960 | 27.5 |
| 9 | 3.4055 | 0.2473 | 1.76264 | 51.7 |
| 10 | −1.2415 | 0.2913 | | |
| *11 | 4.6813 | 0.3386 | 1.51007 | 56.2 |
| *12 | −3.5887 | 0.0099 | | |
| 13 | 1.8875 | 0.3786 | 1.63001 | 60.0 |
| 14 | −18.9250 | 0.5797 | | |
| 15 | ∞ | 1.2087 | 1.51633 | 64.1 |
| 16 | ∞ | | | |

*Aspheric Surface

Aspheric Coefficients

| Surface | K | $A_3$ | $A_4$ | $A_5$ |
|---|---|---|---|---|
| 3 | 1.0000 | 0.0000 | $1.0671 \times 10^{-1}$ | 0.0000 |
| 4 | 1.0000 | 0.0000 | $2.3882 \times 10^{-3}$ | 0.0000 |
| 11 | 0.9992 | 0.0000 | $1.6541 \times 10^{-1}$ | 0.0000 |
| 12 | 1.0065 | 0.0000 | $1.7754 \times 10^{-1}$ | 0.0000 |

| Surface | $A_6$ | $A_7$ | $A_8$ | $A_9$ |
|---|---|---|---|---|
| 3 | $-3.4241 \times 10^{-2}$ | 0.0000 | $-7.4917 \times 10^{-2}$ | 0.0000 |
| 4 | $-1.3119 \times 10^{-1}$ | 0.0000 | $-1.6157 \times 10^{-1}$ | 0.0000 |
| 11 | $1.1115 \times 10^{-1}$ | 0.0000 | $2.1478 \times 10^{-1}$ | 0.0000 |
| 12 | $1.8319 \times 10^{-1}$ | 0.0000 | $2.0472 \times 10^{-2}$ | 0.0000 |

| Surface | $A_{10}$ | $A_{11}$ | $A_{12}$ |
|---|---|---|---|
| 3 | $8.0334 \times 10^{-2}$ | 0.0000 | 0.0000 |
| 4 | $2.5907 \times 10^{-2}$ | 0.0000 | 0.0000 |
| 11 | $-3.7395 \times 10^{-2}$ | 0.0000 | 0.0000 |
| 12 | $4.5283 \times 10^{-1}$ | 0.0000 | 0.0000 |

Also, numerical values corresponding to the above conditional expressions in the example 3 are given in the table 5.

Figure 7:
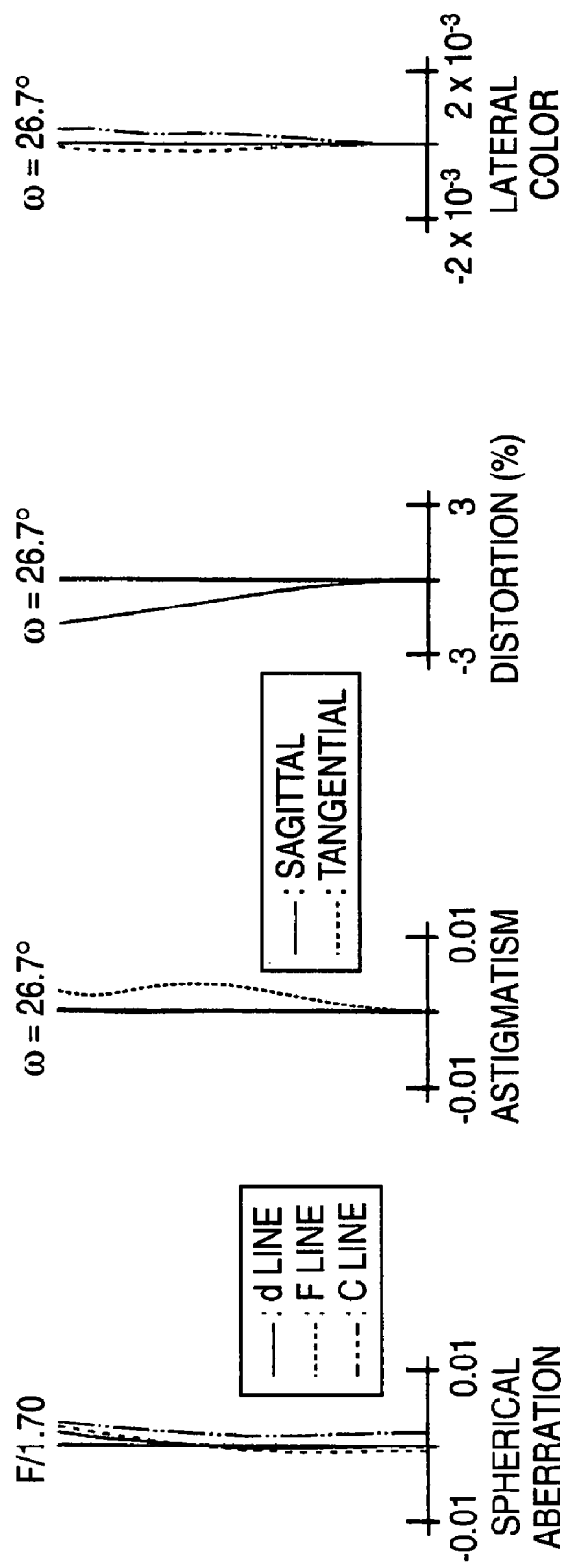
FIG. 7 is respective aberration charts of the projection lens according to the example 3.

FIG. 7 is aberration charts showing various aberrations (spherical aberration, astigmatism, distortion, and lateral color) of the projection lens according to the example 3.

As apparent from FIG. 7, according to the projection lens of the example 3, the angle of view 2ω is 53.4 degrees and wide and the respective aberrations are corrected satisfactorily. In particular, the lateral color is very satisfactorily corrected.

Also, as shown in the table 5, according to the projection lens of the example 3, the conditional expressions (1), (2a), (2b), (3a), (3b), (4), (5) and (6) are satisfied.

Example 4

Figure 4:
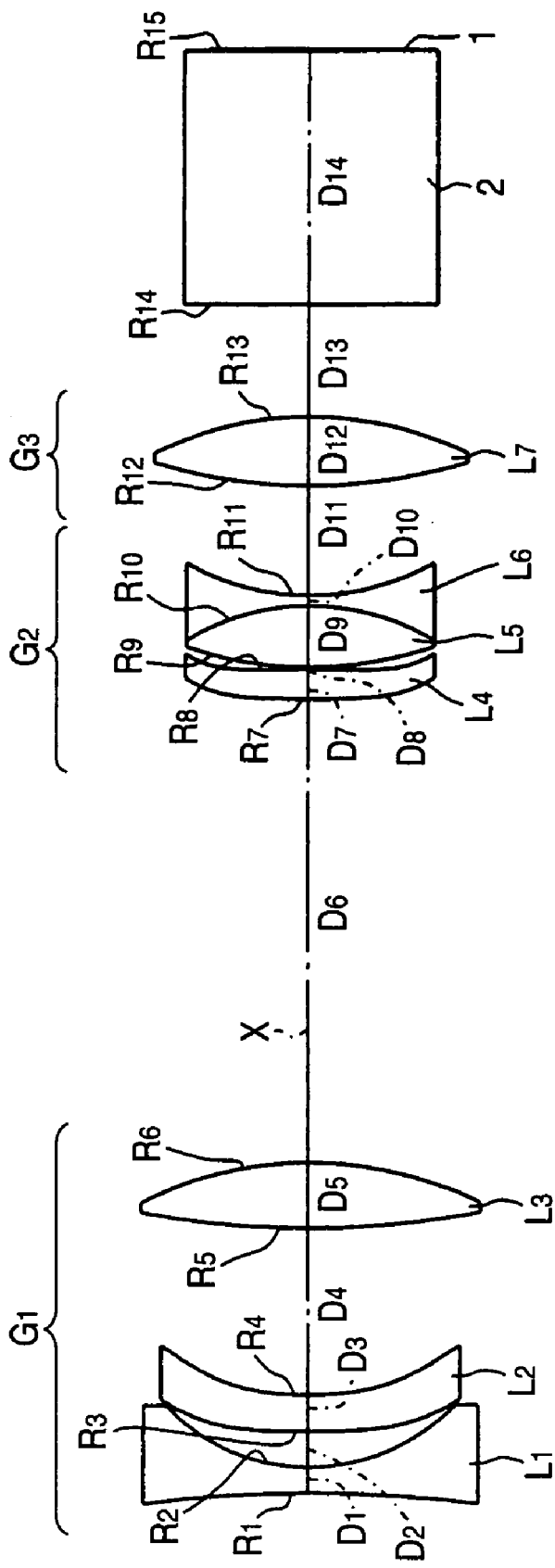
FIG. 4 is a lens configurative view of a projection lens according to an example 4.

The schematic configuration of a projection lens according to the example 4 is shown in FIG. 4. The projection lens according to the example 4 is configured substantially similarly to that according to the example 1. A major difference from the example 1 is that the second lens $L_2$ of the first lens group $G_1$ is formed of a negative meniscus lens whose convex surface is directed to the magnification side and that the fourth lens $L_4$ of the second lens group $G_2$ is formed of a biconvex lens.

Although not shown in FIG. 4, a mask may be provided. Also, the mask may be a diaphragm.

In this example 4, radii R of curvature of the respective lens surfaces, center thicknesses of the respective lenses, air distances D between the respective lenses, refractive indices Nd and Abbe numbers νd of respective lenses with respect to the d line are given on the upper portion of a table 4.

Also, the third surface, the fourth surface and the seventh surface, the eighth surface are formed of the aspherical surfaces, respectively. In a lower portion of the table 4, values of the respective constants K, $A_3$, $A_4$, $A_5$, $A_6$, $A_7$, $A_8$, $A_9$, $A_{10}$, $A_{11}$, $A_{12}$ as to these aspheric surfaces in the above aspheric formula are given.

TABLE 4

| Surface | R | D | Nd | ν d |
|---|---|---|---|---|
| 1 | −6.2710 | 0.1239 | 1.57135 | 53.0 |
| 2 | 0.9877 | 0.1727 | | |
| *3 | 20.4039 | 0.1735 | 1.49100 | 57.6 |
| *4 | 1.9497 | 0.7999 | | |
| 5 | 4.5264 | 0.3167 | 1.71300 | 53.9 |
| 6 | −1.9081 | 2.2517 | | |
| *7 | 12.1403 | 0.1425 | 1.49100 | 57.6 |
| *8 | −6.2100 | 0.0099 | | |
| 9 | 1.9305 | 0.2979 | 1.71300 | 53.9 |
| 10 | −1.1767 | 0.0501 | 1.68893 | 31.1 |
| 11 | 1.2792 | 0.5284 | | |
| 12 | 2.6613 | 0.3341 | 1.62041 | 60.3 |
| 13 | −1.7543 | 0.5404 | | |
| 14 | ∞ | 1.2147 | 1.51633 | 64.1 |
| 15 | ∞ | | | |

*Aspheric Surface

Aspheric Coefficients

| Surface | K | $A_3$ | $A_4$ | $A_5$ |
|---|---|---|---|---|
| 3 | 1.0000 | 0.0000 | $8.8003 \times 10^{-1}$ | 0.0000 |
| 4 | 1.0000 | 0.0000 | $8.1518 \times 10^{-1}$ | 0.0000 |
| 7 | 1.0000 | 0.0000 | $5.2058 \times 10^{-1}$ | 0.0000 |
| 8 | 1.0000 | 0.0000 | $6.0791 \times 10^{-1}$ | 0.0000 |

| Surface | $A_6$ | $A_7$ | $A_8$ | $A_9$ |
|---|---|---|---|---|
| 3 | −1.2448 | 0.0000 | 1.4236 | 0.0000 |
| 4 | −1.2137 | 0.0000 | 1.0032 | 0.0000 |
| 7 | $2.4897 \times 10^{-1}$ | 0.0000 | $4.9640 \times 10^{-1}$ | 0.0000 |
| 8 | $3.8175 \times 10^{-1}$ | 0.0000 | $4.9587 \times 10^{-1}$ | 0.0000 |

| Surface | $A_{10}$ | $A_{11}$ | $A_{12}$ |
|---|---|---|---|
| 3 | $-8.8206 \times 10^{-1}$ | 0.0000 | 0.0000 |
| 4 | $-7.3148 \times 10^{-1}$ | 0.0000 | 0.0000 |

TABLE 4-continued

| 7 | −1.9342 | 0.0000 | 2.0130 |
| 8 | −1.2329 | 0.0000 | $8.2884 \times 10^{-1}$ |

Also, numerical values corresponding to the above conditional expressions in the example 4 are given in the table 5.

Figure 8:
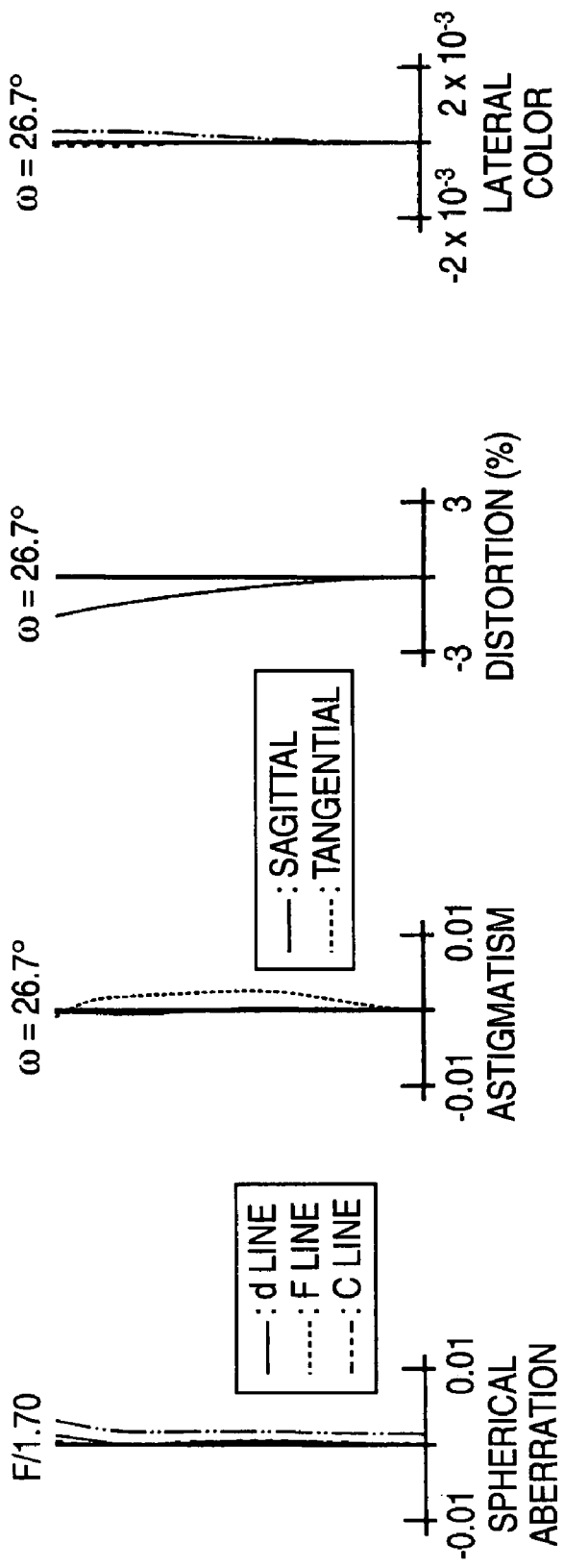
FIG. 8 is respective aberration charts of the projection lens according to the example 4.

FIG. 8 is aberration charts showing the various aberrations (spherical aberration, astigmatism, distortion, and lateral color) of the projection lens according to the example 4.

As apparent from FIG. 8, according to the projection lens of the Example 4, the angle of view 2ω is 53.4 degrees and wide and the respective aberrations are corrected satisfactorily. In particular, the lateral color is very satisfactorily corrected.

Also, as shown in Table 5, according to the projection lens of the example 4, the conditional expressions (1), (2a), (2b), (3a), (3b), (3c), (4) and (5) are satisfied.

|  | Expression (1) | Expression (2a), (2b) | Expression (3a)~(3c) | Expression (4) | Expression (5) | Expression (6) |
|---|---|---|---|---|---|---|
| Example 1 | 1.38 | 8.57 | 57.08 | 3.69 | 3.93 | X |
| Example 2 | 1.36 | 10.01 | 4.91 | 4.83 | 7.99 | 4.91 |
| Example 3 | 1.37 | 4.64 | 5.70 | 3.38 | 4.04 | 5.70 |
| Example 4 | 1.34 | 7.38 | 43.28 | 4.40 | 8.39 | X |

What is claimed is:

1. A projection lens comprising, in order from a magnification side:
   a first lens group;
   a second lens group; and
   a third lens group, wherein:
   the first lens group comprises, in order from the magnification side:
      a negative lens whose lens made of a non-resin;
      a plastic lens at least one surface of which is aspheric; and
      a positive lens,
   the second lens group comprises:
      a plastic lens at least one surface of which is aspheric;
      a positive lens; and
      a negative lens,
   the third lens group comprises a positive lens, and
   the following conditional expressions (1), (2a) and (3a) are satisfied;

$$1.0 < Bf/f \leq 1.8 \quad (1)$$

$$2.0 < f1/f \quad (2a)$$

$$2.0 < f2/f \quad (3a)$$

where Bf denotes a air-conversion back focus of the entire system, f denotes a focal length of the entire system, f1 denotes a focal length of the first lens group and f2 denotes a focal length of the second lens group.

2. The projection lens according to claim 1, wherein:
   a system from a surface of the positive lens of the third lens group on a reduction side to a display surface is substantial telecentric, and
   the following conditional expressions (2b) and (3b) are further satisfied;

$$4.0 < f1/f \quad (2b)$$

$$3.5 < f2/f \quad (3b).$$

3. The projection lens according to claim 2, wherein the following conditional expressions (4) and (5) are further satisfied;

$$2.5 < |AS1|/f \quad (4)$$

$$2.5 < |AS2|/f \quad (5)$$

where AS1 denotes a focal length of the plastic aspheric lens of the first lens group, and AS2 denotes a focal length of the plastic aspheric lens of the second lens group.

4. The projection lens according to claim 3, wherein:
   in the second lens group, the plastic lens the at least one surface of which is aspheric, the positive lens and the negative lens are arranged in order from the magnification side, and
   the positive lens of the second lens group and the negative lens of the second lens group are cemented.

5. The projection lens according to claim 2, wherein:
   in the second lens group, the plastic lens the at least one surface of which is aspheric, the positive lens and the negative lens are arranged in order from the magnification side, and
   the positive lens of the second lens group and the negative lens of the second lens group are cemented.

6. The projection lens according to claim 5, wherein the following conditional expression (3c) is further satisfied;

$$10.0 < f2/f \quad (3c).$$

7. The projection lens according to claim 2, wherein:
   in the second lens group, the plastic lens at the least one surface of which is aspheric, the negative lens and the positive lens are arranged in order from the magnification side, and
   the negative lens of the second lens group and the positive lens of the second lens group are cemented.

8. The projection lens according to claim 7, wherein the following conditional expression (6) is further satisfied;

$$f2/f < 10.0 \quad (6).$$

9. The projection lens according to claim 2, wherein:
   in the second lens group, the negative lens, the positive lens and the plastic lens the at least one surface of which is aspheric are arranged in order from the magnification side, and
   the negative lens of the second lens group and the positive lens of the second lens group are cemented.

10. The projection lens according to claim 9, wherein the following conditional expression (6) is further satisfied;

$$f2/f < 10.0 \quad (6).$$

11. A projection type display device, comprising:
a light source;
a light valve;
an illumination optical portion that guides a luminous flux from the light source to the light valve; and
the projection lens according to claim 2, wherein:
the luminous flux from the light source is optically modulated by the light valve and is projected onto a screen by the projection lens.

12. The projection lens according to claim 1, wherein the following conditional expressions (4) and (5) are further satisfied;

$$2.5 < |AS1/f| \tag{4}$$

$$2.5 < |AS2/f| \tag{5}$$

where AS1 denotes a focal length of the plastic aspheric lens of the first lens group, and AS2 denotes a focal length of the plastic aspheric lens of the second lens group.

13. The projection lens according to claim 12, wherein:
in the second lens group, the plastic lens the at least one surface of which is aspheric, the positive lens and the negative lens are arranged in order from the magnification side, and
the positive lens of the second lens group and the negative lens of the second lens group are cemented.

14. The projection lens according to claim 1, wherein:
in the second lens group, the plastic lens the at least one surface of which is aspheric, the positive lens and the negative lens are arranged in order from the magnification side, and
the positive lens of the second lens group and the negative lens of the second lens group are cemented.

15. The projection lens according to claim 14, wherein the following conditional expression (3c) is further satisfied;

$$10.0 < f2/f \tag{3c}$$

16. The projection lens according to claim 1, wherein:
in the second lens group, the plastic lens at the least one surface of which is aspheric, the negative lens and the positive lens are arranged in order from the magnification side, and
the negative lens of the second lens group and the positive lens of the second lens group are cemented.

17. The projection lens according to claim 16, wherein the following conditional expression (6) is further satisfied;

$$f2/f < 10.0 \tag{6}$$

18. The projection lens according to claim 1, wherein:
in the second lens group, the negative lens, the positive lens and the plastic lens the at least one surface of which is aspheric are arranged in order from the magnification side, and
the negative lens of the second lens group and the positive lens of the second lens group are cemented.

19. The projection lens according to claim 18, wherein the following conditional expression (6) is further satisfied;

$$f2/f < 10.0 \tag{6}$$

20. A projection type display device, comprising:
a light source;
a light valve;
an illumination optical portion that guides a luminous flux from the light source to the light valve; and
the projection lens according to claim 1, wherein:
the luminous flux from the light source is optically modulated by the light valve and is projected onto a screen by the projection lens.

* * * * *